United States Patent [19]

Sengupta et al.

(10) Patent No.: US 11,036,799 B2
(45) Date of Patent: *Jun. 15, 2021

(54) LOW RAM SPACE, HIGH-THROUGHPUT PERSISTENT KEY VALUE STORE USING SECONDARY MEMORY

(71) Applicant: Microsoft Technology Licensing, LLC, Redmond, WA (US)

(72) Inventors: Sudipta Sengupta, Sammamish, WA (US); Biplob Kumar Debnath, Princeton, NJ (US); Jin Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,587

(22) Filed: Feb. 8, 2020

(65) Prior Publication Data

US 2020/0175070 A1 Jun. 4, 2020

Related U.S. Application Data

(63) Continuation of application No. 12/908,153, filed on Oct. 20, 2010, now Pat. No. 10,558,705.

(51) Int. Cl.
*G06F 16/22* (2019.01)
*G06F 16/901* (2019.01)
*G06F 12/0864* (2016.01)

(52) U.S. Cl.
CPC ...... *G06F 16/9014* (2019.01); *G06F 12/0864* (2013.01); *G06F 16/2255* (2019.01)

(58) Field of Classification Search
CPC ............. G06F 12/0864; G06F 12/1018; G06F 16/137; G06F 16/2255; G06F 16/9014
See application file for complete search history.

(56) References Cited

U.S. PATENT DOCUMENTS

| 10,417,233 | B2* | 9/2019 | Sabaa | H04L 67/2842 |
| 10,474,631 | B2* | 11/2019 | Beaverson | G06F 16/13 |
| 2007/0106876 | A1* | 5/2007 | Goswami | G06F 16/2272 711/216 |

* cited by examiner

*Primary Examiner* — Nicholas J Simonetti
(74) *Attorney, Agent, or Firm* — Davin Chin; Chin IP, PLLC (57) ABSTRACT

Described is using flash memory (or other secondary storage), RAM-based data structures and mechanisms to access key-value pairs stored in the flash memory using only a low RAM space footprint. A mapping (e.g. hash) function maps key-value pairs to a slot in a RAM-based index. The slot includes a pointer that points to a bucket of records on flash memory that each had keys that mapped to the slot. The bucket of records is arranged as a linear-chained linked list, e.g., with pointers from the most-recently written record to the earliest written record. Also described are compacting non-contiguous records of a bucket onto a single flash page, and garbage collection. Still further described is load balancing to reduce variation in bucket sizes, using a bloom filter per slot to avoid unnecessary searching, and splitting a slot into sub-slots.

20 Claims, 8 Drawing Sheets

LOW RAM SPACE, HIGH-THROUGHPUT PERSISTENT KEY VALUE STORE USING SECONDARY MEMORY

CROSS-REFERENCE TO RELATED APPLICATION(S)

This application is a continuation of U.S. patent application Ser. No. 12/908,153, filed Oct. 20, 2010, entitled "LOW RAM SPACE, HIGH-THROUGHPUT PERSISTENT KEY-VALUE STORE USING SECONDARY MEMORY". The entirety of this afore-mentioned application is incorporated herein by reference.

BACKGROUND

Flash media has advantages over RAM and hard disk storage, namely that unlike RAM, flash media is persistent, and unlike hard disk storage, flash media provides much faster data access times, e.g., on the order of hundreds or thousands of times faster than hard disk access. Many applications thus may benefit from the use of flash media.

However, flash media is expensive, at present costing ten to twenty times more per gigabyte than hard disk storage. Further, flash devices are subject to reduced lifetimes due to page wearing, whereby small random writes (that also have relatively high latency) are not desirable. What is desirable is a technology for using flash media (or other non-RAM, non-hard disk storage) that provides high performance, while factoring in cost considerations, efficiency and media lifetimes.

U.S. patent application Ser. No. 12/773,859, assigned to the assignee of the present invention and herein incorporated by reference, describes a flash-based or other secondary storage memory cache having these desired characteristics, such as for use in storing key-value pairs. However, the amount of RAM used is on the order of six bytes (two signature bytes plus four pointer bytes) for each key-value pair maintained in secondary (e.g., flash) storage. Reducing the amount of RAM used is desirable in many scenarios.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a secondary storage device (e.g., in flash memory) contains buckets of linked record, in which the bucket for a record is determined by mapping the record's key to a RAM-based index having slots corresponding to pointers to the buckets. There are more possible keys than slots/buckets, resulting in collisions that are handled by searching the bucket in a most-recent to least-recent ordering until a match is found, (if any exists).

To maintain the ordering, each record is associated with a pointer to the previous record in its bucket, and so on, forming a linked list of records. When a new record is inserted into the secondary storage, the previous pointer in the RAM-based index is associated with the record to be inserted (e.g., as part of a page write that includes the new record), and the index updated to point to the new record, thereby maintaining the linked list ordering.

In one aspect, a counter may be associated with each slot of the index to indicate the size of the chain of records in the bucket that corresponds to that slot. If the size is too large, compaction may be performed to writes a plurality of non-contiguous records of a bucket to a single page of contiguous records.

In one aspect, a bloom filter may be associated with each slot to indicate to a high probability whether a key of a record is in the bucket that corresponds to that slot. If not, the bucket need not be searched for that key.

In one alternative, a load balancing mechanism may operate to balance chain sizes in the buckets. For example, a key to be inserted may be mapped by multiple mapping functions to multiple candidate slots, with one candidate slot selected based upon the chain sizes of the candidate buckets. The key is then inserted into the bucket that corresponds to the selected slot. A bloom filter may be used to avoid searching both candidate buckets when later looking up that record.

In one alternative, the index may comprise a first index component and a second index component. Individual slots in the first index may be configured to indicate that a key mapped to such a slot in the first index by a first mapping function is to be secondarily mapped to a slot in the second index by a second mapping function. This facilitates splitting a slot in the first index into sub-slots, such as if the first index slot corresponds to too many keys.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using secondary storage (e.g., flash media storage) in a manner that uses only a relatively very small-sized RAM footprint compared to other technologies, such as for storing key-value pairs. To this end, key-value pairs are mapped by their keys into buckets (of chained records) in sequential secondary storage, with a chain of pointers that relate records of each bucket to the other entries in that bucket. Mapping collisions are thus placed into the same bucket, which is searched to find a matching key. As a result, instead of maintaining pointers in RAM, many of the pointers are maintained in the secondary storage. In one implementation, this results in a RAM footprint on the order of one (plus or minus one-half) byte of RAM per key-value pair.

It should be understood that any of the examples herein are non-limiting. Indeed, the technology described herein applies to any type of non-volatile storage that is faster than disk access, not only the flash media exemplified and referred to as an example herein. Thus, as used herein, "flash" is only an example that does not necessarily mean conventional flash media, but in general refers to any secondary storage (with conventional RAM considered primary storage). Moreover, the data structures described herein are only examples; indeed, the storage of any keyed records, not necessarily key-value pairs, may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data storage and retrieval in general.

Figure 1:
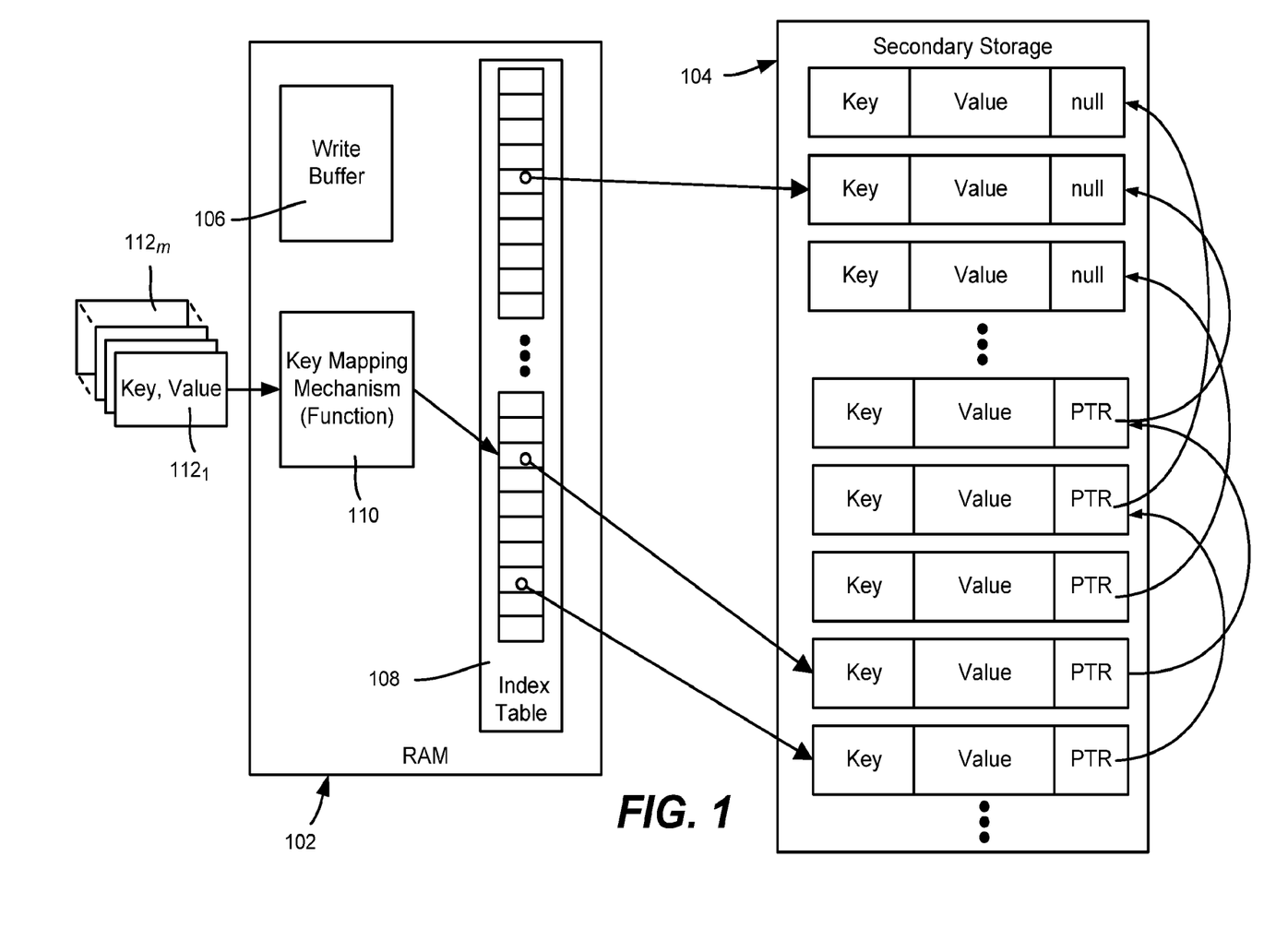
FIG. 1 is a block diagram representing an example architecture and data structures for mapping records to secondary storage using a relatively small-sized RAM footprint.

FIG. 1 shows example architectural components of one implementation of a key-value store maintained using relatively very fast RAM 102 and non-volatile secondary storage 104 (e.g., relatively fast compared to hard disk storage), which may be configured in flash media arranged as pages. In one implementation, the secondary storage 104/flash store is basically arranged as a sequential log/file. More particularly, the flash store provides persistent storage for the keyed records (e.g., key-value pairs), and in one implementation is organized as a circular append log. Key-value pairs are written to flash in units of a page size to the tail of the log. When the log accumulates garbage (comprising deleted records, older values of updated records and/or orphaned records, described below) beyond a configurable threshold, the pages on flash from the head of the log are recycled such that valid entries from the head of the log are written back to the end of the log. Also described below is compacting the records in a given bucket into a single page on flash, which improves read performance, as described below.

As generally as described in the aforementioned U.S. patent application Ser. No. 12/773,859, the RAM 102 includes a write buffer 106 comprising an (e.g., fixed-size) data structure that buffers key-value writes so that a write to flash happens only after there is enough data to fill a flash page (which is typically 2 KB or 4 KB in size). As also described therein, writes also may occur upon a configurable timeout interval being reached.

The RAM 102 also includes an index data structure (directory), exemplified as an index table 108, which has pointers (each being a combination of a page pointer and a page offset) to key-value pairs stored on the secondary storage 104. A key mapping mechanism/function 110, such as comprising a hash function or range-mapping function, maps each key of key-value pairs 1121-112$m$ to one of N slots (each slot corresponding to a bucket) in the index table 108, where N may be configurable for a given implementation thereby controlling the amount of RAM used for indexing. In other words, the hash function or range mapping function maps any key value to one slot of a plurality thereof, in which the number depends on the mapping function, and is thus configurable.

Each slot contains a pointer to a chain (linked list) of one or more records in the secondary storage 104. The records thus include a pointer field that forms the chain. More particularly, in addition to the key and value fields, each key-value pair record in the secondary storage 104 contains a pointer to the next record (in the order in its respective chain), that is, the previous record (key-value pair) in the sequential log that was mapped to the same slot as the new key-value pair. The chain of records on flash pointed to by each slot thus comprises the bucket of records corresponding to that slot in the index table 108.

Thus, as is understood, mapping collisions are resolved by linear chaining with the chains stored in flash. The average number of records in a bucket, k, is a generally configurable parameter. More particularly, because the chain of key-value pairs in each bucket is typically stored non-contiguously on flash, multiple flash reads may be incurred upon lookup of a key in the store. Lookup time versus RAM space overhead per key-value pair is a tradeoff. The average number of keys in a bucket k is a configurable parameter that allows controlling the tradeoff between RAM space usage versus lookup times.

Figure 2:
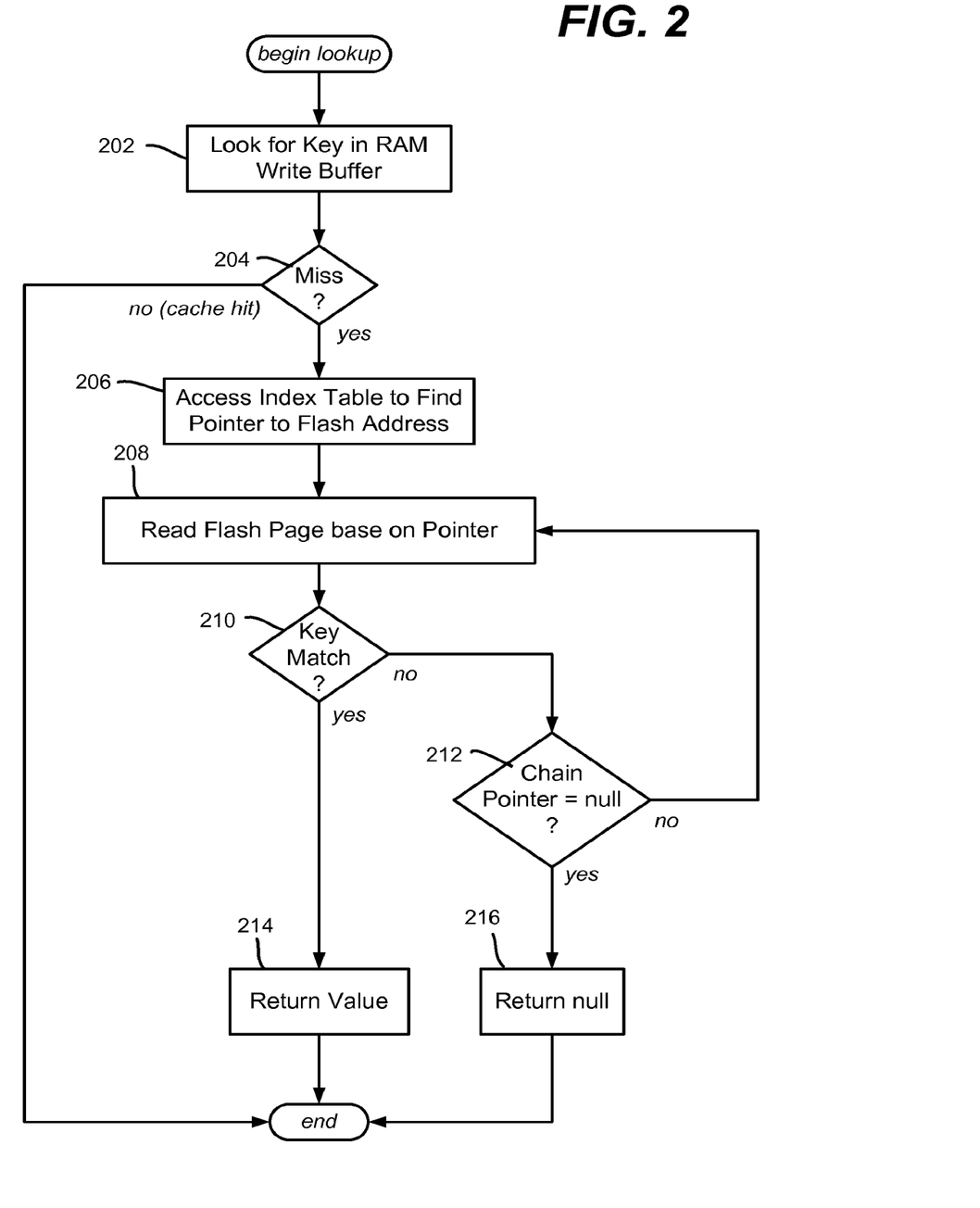
FIG. 2 is a flow diagram representing example steps for looking up a record key (e.g., of a key-value pair), including in secondary storage.
Figure 3:
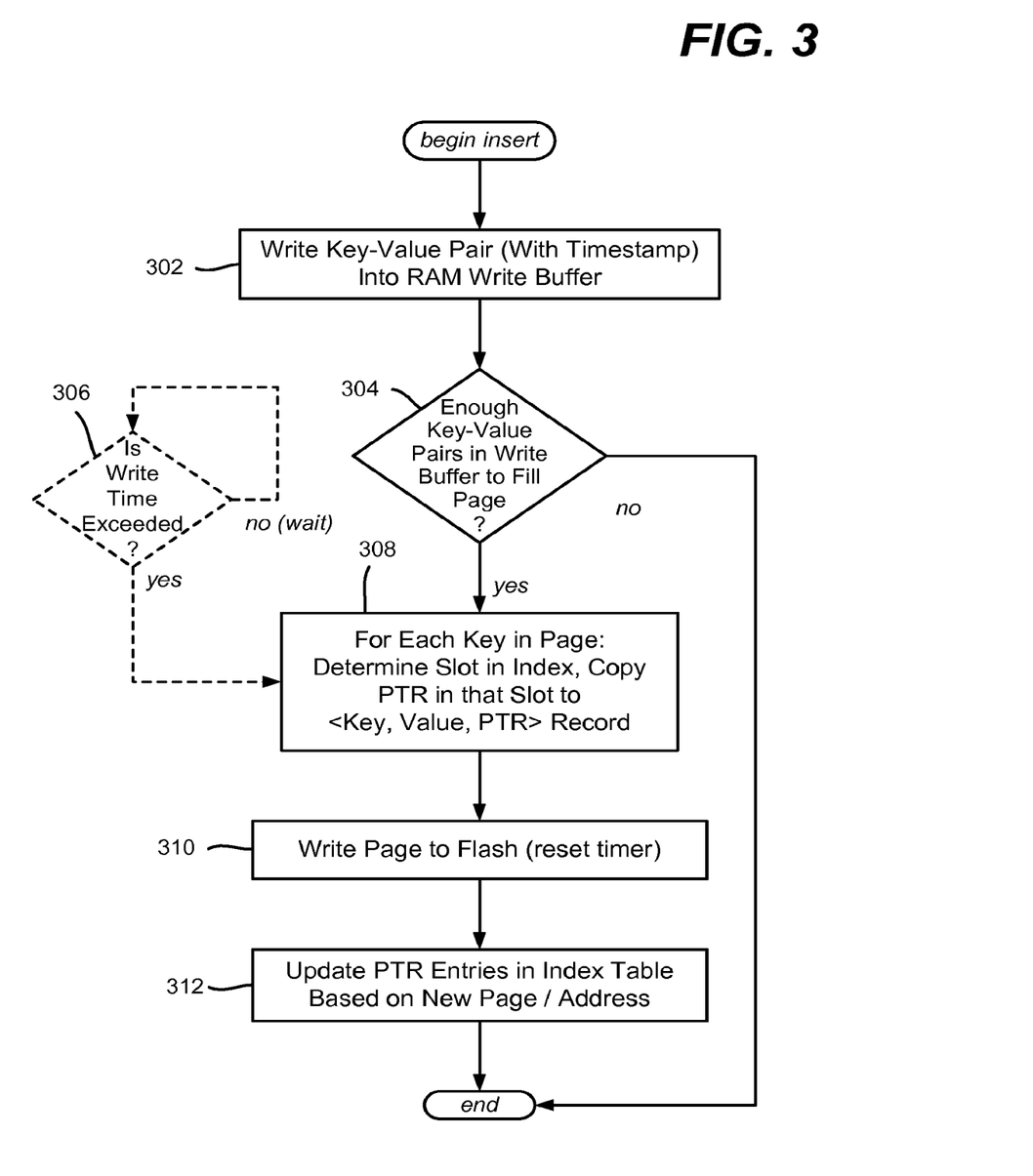
FIG. 3 is a flow diagram representing example steps for inserting a keyed record into secondary storage (as part of a page of records).

By way of further explanation, consider the following sequence of accesses in key lookup and insert operations performed by a client application, as generally summarized in the flow diagrams of FIGS. 2 and 3, respectively. As represented by step 202 of FIG. 2, a key lookup (get) operation first looks for a key in the RAM write buffer 106. Upon a miss (step 204), the operation moves to step 206 to look up the key in the index table 108 to find a pointer to the location in secondary storage 104 of the most recent record written to that bucket. For example, a lookup operation on a key uses the hash mapping or range mapping function to determine the index table slot to which the given key belongs, with the pointer in that slot identifying the starting address in secondary storage of that key's bucket.

Beginning with the pointer stored in that slot, the lookup operation follows the chain of records on flash to search for the key, e.g., by reading the appropriate page and searching that page for the matching key. If that page does not contain the matching key, step 212 repeats the process using the pointer in the key's record at that address; (note that a new page only need be read in if the pointer is to a new page). Upon finding the first record in the chain whose key matches the search key, the lookup operation returns the value associated with that key, as represented by step 214; (if there is no matching key, null is returned via step 216). The number of flash reads for such a lookup is k/2 on the average, and in the worst case is the size k of the bucket chain.

As generally represented in FIG. 3, a key insert (or, update/set) operation writes (step 302) the key-value pair into the RAM write buffer 106. As represented by step 304, when there are enough key-value pairs in the RAM write buffer 106 to fill a flash page (or, a configurable timeout interval since the client call has expired at step 306, such as on the order of one millisecond), the buffered entries are written to the secondary storage 104. To this end, at step 308, for each key-value pair to be written to the secondary storage 104, the pointer that was previously in that key's slot is also written to the secondary storage 104 at step 310, e.g., as a <Key, Value, PTR> record in the page. At step 312, the pointer in the index table slot is changed to point to the address of that newly written key-value pair. Note that in building the page, ordering is kept so that the index table points to the most-recently inserted record, and that record points to the next most recent, and so on.

To summarize, for a given key, the insert operation uses the mapping function to determine the index table slot to which that key belongs. For example, if a1 represents the address on flash of the first record in this chain (that is, what the pointer in the slot currently points to), then a record is created in flash that corresponds to the inserted (or, updated) key-value pair with its next-pointer field equal to a1. This record is appended to the log on flash at its own flash address a2; and the a2 address on flash placed as the value of the pointer in the respective slot in RAM. Effectively, this newly written record is inserted at the beginning of the chain corresponding to this bucket.

Note that if the insert operation corresponds to an update operation on an earlier-inserted key, the most recent value of the key will be (correctly) read during a lookup operation because it will be reached by following the chain, which links from most recent to older written records. Any older key will not be reached before the more recent one, because the old value is further down the chain; the older key will be cleaned up as garbage in the log, as described below.

A delete operation on a key is supported through insertion of a null value for that key. Eventually the null entries and any earlier-inserted values of a key on flash are garbage collected. In one implementation, when flash usage and/or the fraction of garbage records in the flash log exceed a certain threshold, a garbage collection (and compaction) operation is initiated to reclaim storage on flash.

Turning to maintenance operations, namely compaction and garbage collection, as will be understood, compaction is useful in improving lookup latencies by reducing the number of flash reads when searching a bucket. Garbage collection reclaims storage on flash, and is a consequence of flash being used in a log-structured manner.

With respect to compaction, as described above, a lookup operation involves following the chain of key-value records in a bucket on flash. For a chain length of c records in a bucket, this involves an average of c/2 flash reads. Over time, as keys are inserted into a bucket and earlier inserted keys are updated, the chain length for this bucket keeps increasing, which degrades lookup times. This situation may be addressed by periodically compacting the chain on flash in a bucket, which in general places the valid keys in that chain (those that were not deleted or updated with a new value) contiguously on one or more flash pages that are appended to the tail of the log. Thus, if m key-value pairs can be packed onto a single flash page (on the average), the number of flash reads required to search for a key in a bucket of k records is k/(2 m) on the average and at most [k/m] in the worst case. Note that key-value pairs that have been compacted remain in their previous location on flash until garbage collected; these are referred to as orphaned key-value pairs.

Figure 4:
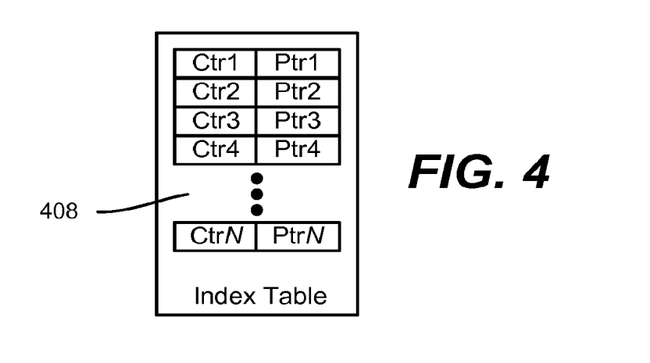
FIG. 4 is a representation of a data structure that maintains counters in association with pointers of an index table.

In order to determine whether to compact a bucket of chained key-value pairs, rather than following each chain and counting its length, a counter (Ctr) may be maintained in the index table for each slot corresponding to that bucket. This is generally represented in the index table 408 of FIG. 4 (although other arrangements to associate the data may be alternatively employed) by counters Ctr1-CtrN associated with pointers Ptr1-PtrN for N slots. In general, the counter may be one byte in length and is incremented to match the chain size of non-compacted records, up to its limit.

Figure 5:
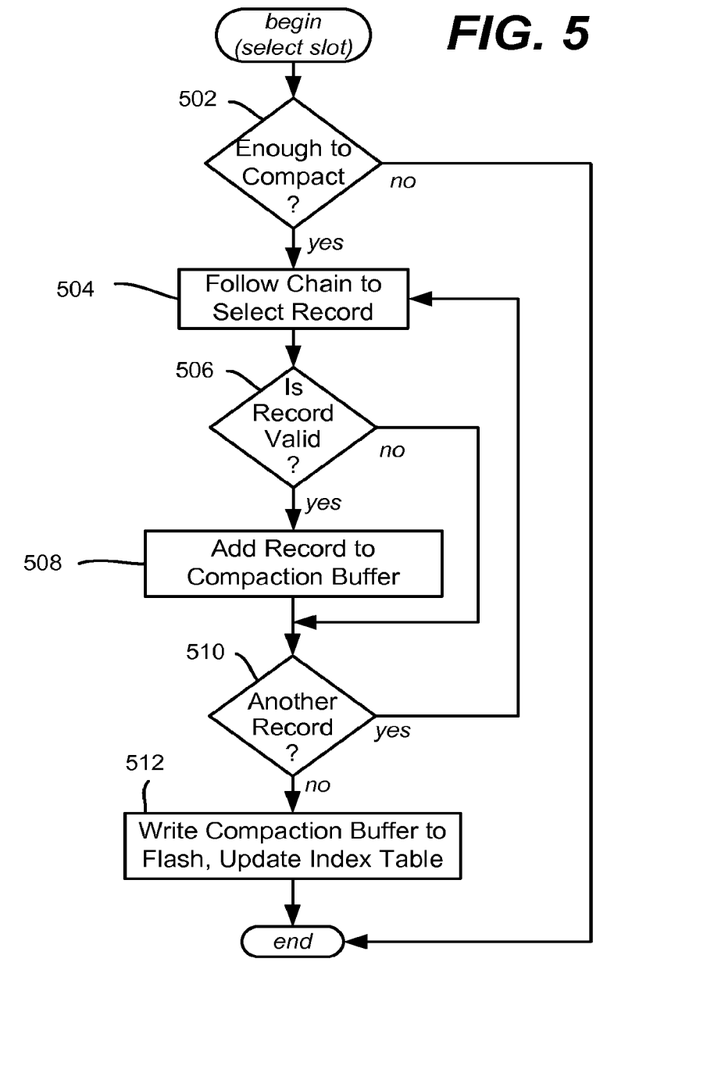
FIG. 5 is a flow diagram representing example steps for compacting a chain of records onto a single page in secondary storage.

The compaction operations may proceed over time, such as per slot/bucket as shown in FIG. 5, e.g., via a compaction mechanism 660 (FIG. 6), (which may be integrated with a garbage collection mechanism described below). Initially, as key-value pairs are added at different times to a bucket, they appear on different flash pages and are chained together individually on flash. When enough valid records accumulate in a bucket to fill a flash page (e.g., m of them as evaluated at step 502), such as tracked by the slot's counter, the records are compacted and appended onto a new flash page, such as at the tail of the log. To this end, the valid records of the chain are found via steps 504, 506 and 510, and added to a compaction buffer 606 (FIG. 6) in RAM at step 508. When the records are buffered, the compaction buffer 606 is written to a flash page and the index updated at the slot to point to that page (step 512). The chain now comprises a single flash page size and requires one flash read (instead of approximately m reads) to fully search.

Figure 6:
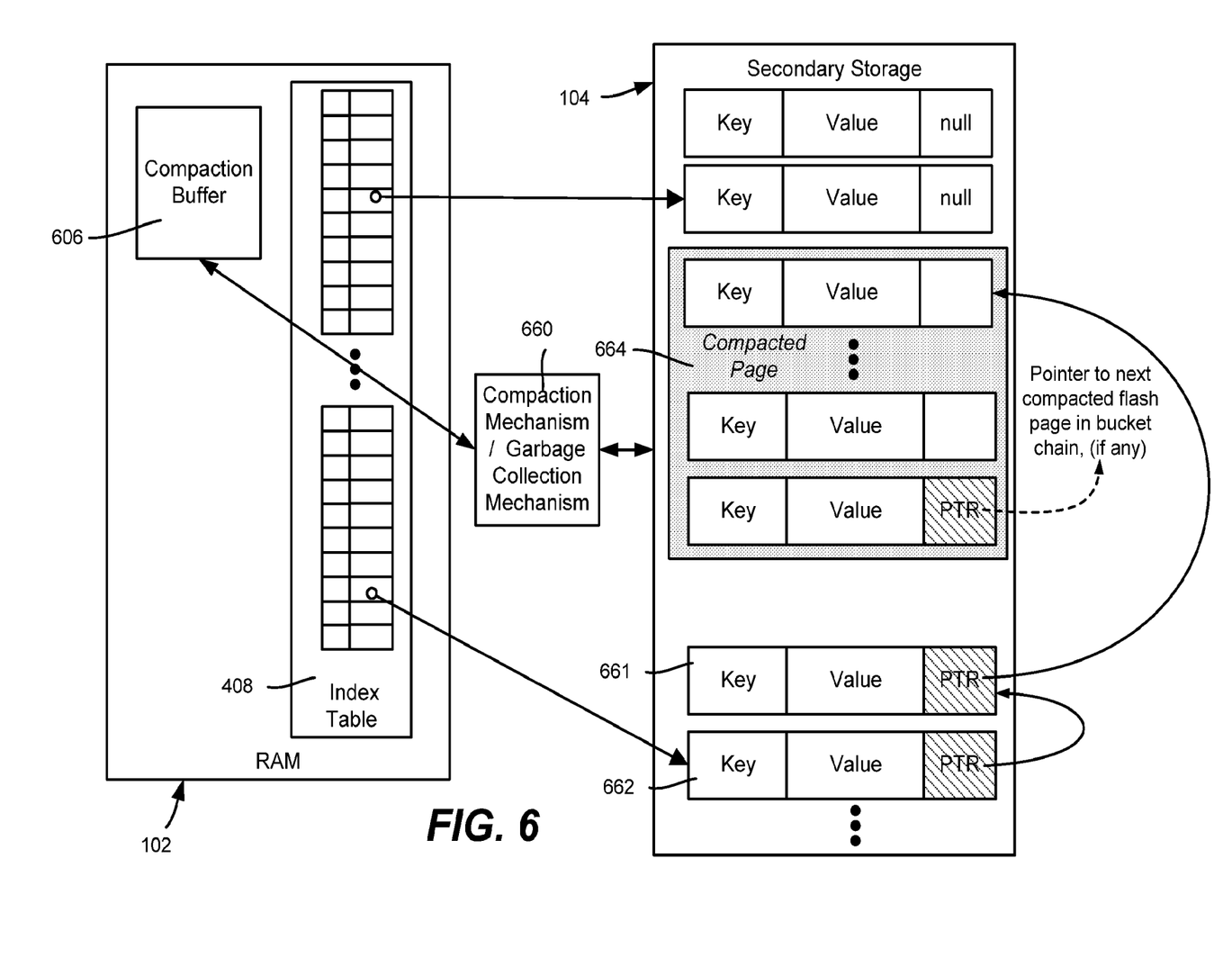
FIG. 6 is a block diagram representing an example architecture and data structures illustrating compaction and garbage collection.

Thereafter, as further records 661 and 662 are appended to a bucket as generally represented in FIG. 6, they are chained together individually and are searched before the compacted group of records in the chain, that is, before the flash page 664 (shown shaded in FIG. 6). Thus, once compacted, at any given time, the chain on flash for each bucket may begin with a chained sequence of one or more individual records 661, 662 followed by groups of compacted records, with each group appearing on the same flash page (e.g., the page 664).

Over time, enough new records may accumulate in the bucket to allow them to be compacted to a second flash page, and so on. To this end, the compaction process repeats, whereby the chain now comprises two compacted flash pages, and so on. Because an insert operation may make a record on a compacted page invalid, previously compacted pages may be re-compacted.

Note that when a key-value pair size is relatively small, e.g., 64 bytes, there may not be enough records in a bucket to fill a flash page, because this number is (roughly) upper bounded by the parameter k. In this case, the benefits of compaction may be obtained by applying the procedure to groups of chains in multiple buckets at a time.

Because compaction copies records to the end of the log (or optionally to another log) and accordingly adjusts the pointers, the original records are not deleted, however there are no longer any pointers that point to them. These no-longer-pointed-to records are referred to as orphaned records (a type of garbage) in the flash log. As mentioned above, other garbage records also accumulate in the log as a result of key update and delete operations, that is, invalid records are present. These orphaned and invalid records are garbage collected.

In one implementation, the garbage collection operation starts scanning key-value pairs from the (current) head of the log, and skips over garbage (invalid or orphaned) key-value pair records while copying valid key-value pair records from the head to the tail of the log, including adjusting pointers as appropriate for the new location. Once the valid records of a page have been copied, that page can be reused when later needed in the circular log. Garbage collection may stop when floor thresholds are reached for flash usage and/or fraction of garbage records remaining in the flash log.

More particularly, when a certain configurable fraction of garbage accumulates in the log (in terms of space occupied), a cleaning operation is performed to clean and compact the log. The cleaning operation considers currently used flash pages in oldest first order and deallocates them. On each page, the sequence of key-value pairs is scanned to determine whether they are valid or not. The classification of a key-value pair record on flash follows from doing a lookup on the respective key starting from the index table (if this record is the same as that returned by the lookup, then it is valid). If it appears later in the chain than a valid record for that key, then this record is invalid and corresponds to an obsolete version of the key; otherwise, the record is orphaned and cannot be reached by following pointers from the index table (this may happen because of the compaction procedure, for example). When an orphaned record is encountered at the head of the log, it is skipped and the head position of the log is advanced to the next record. As described above with reference to the insertion operation, the first record in each bucket chain (the one pointed to from the index table slot) is the most recently inserted record, while the last record in the chain is the earliest inserted record in that bucket. Thus, the last record in a bucket chain is encountered first during the garbage collection process and it may be a valid or invalid (obsolete version of the respective key) record. A valid record needs to be reinserted at the tail of the log, while an invalid record can be skipped. In either situation, the next pointer in its predecessor record in the chain needs to be updated. To avoid in-place updates (random writes) on flash, this requires relocating the predecessor record and so forth all the way to the first record in the chain.

In one implementation, entire bucket chains on flash are garbage collected at a time. When the last record in a bucket chain is encountered in the log during garbage collection, all valid records in that chain are compacted and relocated to the tail of the log. In other words, when the garbage collector is invoked, scanning starts from the (current) head of the log and skips over orphaned records until it encounters the first valid or invalid record (that is part of some bucket chain). Then, the garbage collector collects that entire bucket chain, compacts and writes the valid records in that chain to the tail of the log, and returns.

This garbage collection strategy provides a benefit in that the writing of an entire chain of records in a bucket to the tail of the log also allows them to be compacted and placed contiguously on one or more flash pages, and helps to speed up the lookup operations on those keys. Another benefit is that because garbage (orphaned) records are created further down the log between the (current) head and tail (corresponding to the locations of all records in the chain before relocation), the garbage collection process is sped up for the respective pages when they are encountered later, since orphaned records can be simply discarded.

Note that in one implementation, the client key lookup/insert operations, writing key-value pairs to flash store and updating the RAM index operations, and reclaiming space on flash pages operations, are each handled by separate threads in a multi-threaded architecture.

Figure 7:
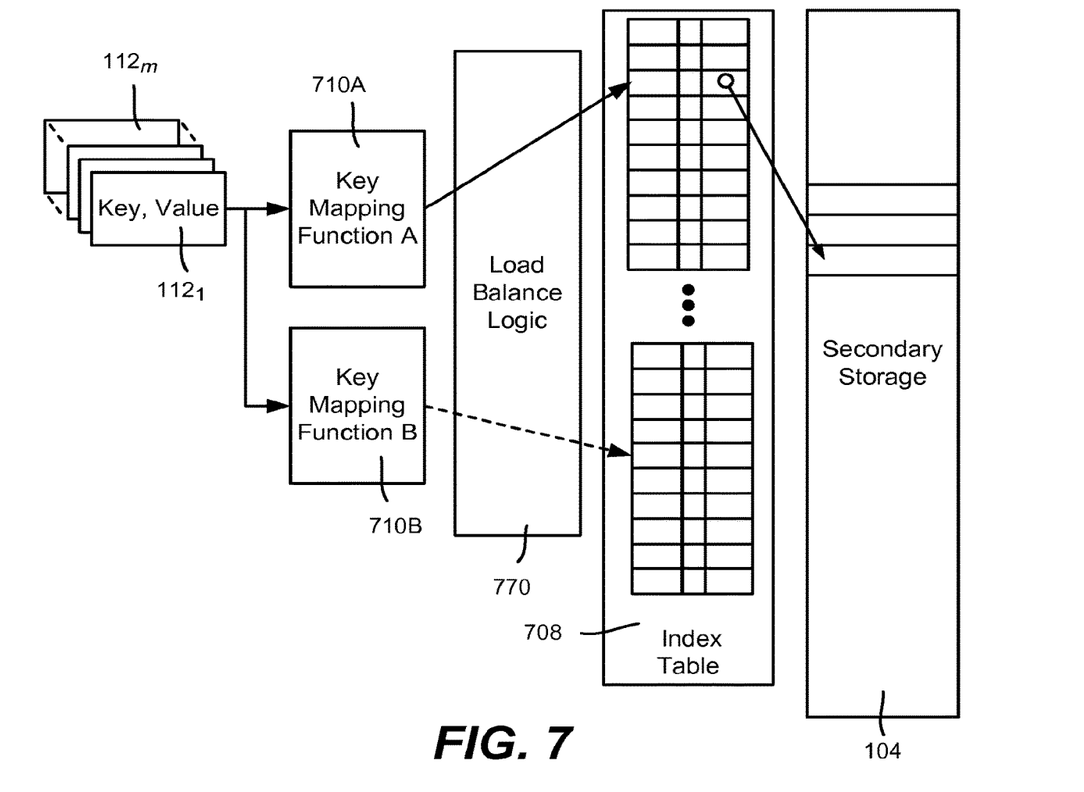
FIG. 7 is a block diagram representing an example architecture and data structures illustrating load balancing.

Turning to an alternative aspect generally represented in FIG. 7, load balancing may be used to reduce variations in bucket sizes, (which correspond to chain lengths and associated lookup times). Otherwise, the mapping of keys to buckets may lead to skewed distributions in the number of keys in each bucket chain, thus creating variations in average lookup times across buckets. Load balancing of keys across buckets may be used to keep each bucket chain about the same size.

One straightforward way to achieve this is to use a known power of (e.g., two) choice idea. For example, with a load balanced design for a hash table mapping function, each key (e.g., 1121 in FIG. 7) may be hashed to two candidate hash table directory buckets, using two hash functions 710A and 710B. The counter in the index table 708, which tracks the size of the chain, may be accessed by load balance logic 770. The candidate bucket with the lesser number of keys is selected for appending the record to that bucket, and its corresponding slot counter incremented. In the example of FIG. 7, the selected slot/bucket is represented by the solid line from key mapping function 710A (rather than the dashed line from 710B).

The above-described load balancing alternative, without more, leads to an increase in the number of flash reads needed during lookup. That is, for a lookup operation, each key may need to be searched for in both of its candidate buckets, whereby the average as well as worst case number of flash reads (and thus corresponding lookup times) doubles.

Figure 8:
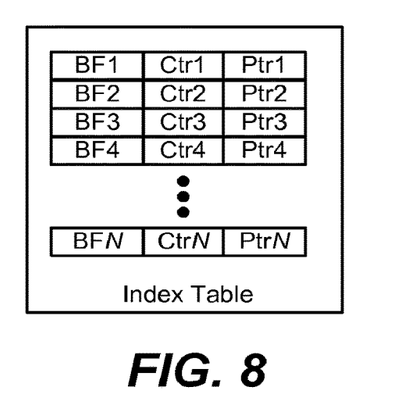
FIG. 8 is a representation of a data structure that maintains bloom filters and counters in association with pointers of an index table.

To avoid this latency, as generally represented in FIG. 8, a bloom filter may be added per index table slot that summarizes the keys that have been inserted in the respective bucket, whereby (most of the time, to a relatively high probability) only one bucket chain on flash needs to be searched during a lookup. In general, a bloom filter contains an entry that either guarantees that a key is not in a chain, or to a high probability indicates that a key may be in a chain; that is, there are no false negatives, although there may be false positives.

Note that the bloom filter in each slot can be sized based on desired characteristics, e.g., to contain about k keys, because load balancing ensures that when the hash table reaches its budgeted full capacity, each bucket will contain not many more than k keys (with very high probability). Dimensioning a bloom filter to use one byte per key gives a false positive probability of two percent; hence the bloom filter in each slot may be of size k bytes. A larger bloom filter decreases the false positive rate, but at the cost of memory, and vice-versa.

Moreover, the introduction of bloom filters has another desirable side effect, namely that lookups on non-existent keys will (almost always) not require any flash reads, because the bloom filters in both candidate slots of the key will likely indicate when a key is not present, and only rarely suggest that a key may be present when it is actually not. This is in contrast to not having bloom filters, in which lookups for non-existent keys lead to flash reads that involve traversing the entire chain in the respective bucket; (indeed, bloom filters may be used without load balancing, including with or without counters, for avoiding looking up non-existent keys).

Still further, while having bloom filters in each bucket reduce lookup times when two-choice load balancing is used, bloom filters themselves also benefit from load balancing. More particularly, load balancing aims to keep the number of keys in each bucket upper bounded (roughly) by the parameter k. This helps to keep bloom filter false positive probabilities in that bucket bounded, as per the dimensioned capacity of k keys. Without load balancing, many more than k keys may be inserted into a given bucket, which increases the false positive rates of the respective bloom filter well beyond that for which it was dimensioned.

The additional fields added to each slot in the index table are represented in FIG. 8, e.g., with k bytes per bloom filter (BF), one byte per chain size counter (Ctr), and four bytes per pointer (Ptr) in one implementation. During a lookup operation, the key is mapped to its two candidate directory buckets, with the chain on flash being searched only if the respective bloom filter indicates that the key may be in that bucket. Thus, accounting for bloom filter false positives, the chain on flash will be searched with no success in less than two percent of the lookups, given a bloom filter dimensioned as described above.

Note that when load balancing and an insert operation corresponds to an update of an earlier inserted key, the record is inserted in the same bucket as the earlier one, even if the choice determined by load balancing (out of two candidate buckets) is the other bucket. Otherwise the key may be inserted in the bloom filters of both candidate slots, which may cause traversing of more than one bucket chain on flash during lookups. Moreover, a similar problem arises with version resolution during lookups if different versions of a key are allowed to be inserted in both candidate buckets. This also leads to efficiencies during garbage collection operations because the obsolete values of a key appear in the same bucket chain on flash. Note that overriding of the load balancing-based choice of insertion bucket can be avoided when the application does not perform updates to earlier inserted keys, which occurs in certain applications, such as storage deduplication.

As can be readily appreciated, the amount of RAM space used is reduced in the implementations described herein. For example, consider that the pointer to flash in each slot is four bytes, which accommodates up to 4 GB of a byte-addressable log. If records are of a fixed size such as sixty-four bytes, then this can accommodate up to 256 GB of 64-byte granularity addressable log. (Larger pointer sizes can be used according to application requirements.) Then, with an average bucket size value of $k=10$, the RAM space overhead is only $4/k=0.4$ bytes=3.2 bits per entry, independent of key-value size. The average number of flash reads per lookup is $k/2=5$; with current flash media achieving flash read times in the range of 10 microseconds, this corresponds to a lookup latency of about 50 microseconds. The parameter k thus provides a mechanism for achieving tradeoffs between low RAM space usage and low lookup latencies.

In an implementation having bloom filters, the RAM space overhead per bucket has three components, e.g., a k-byte bloom filter, a one-byte chain size counter, and a four-byte pointer. This space overhead per slot is amortized over an average of k keys (in that bucket), whereby the RAM space overhead per entry is computed as $(k+1+4)/k=1+5/k$, which is about 1.5 bytes for $k=10$. The average number of flash reads per lookup is $k/2=5$ (with high probability). Moreover, the variation across lookup latencies for different keys is more controlled in this implementation, (compared to a non-bloom filter implementation), as bucket chains are about the same size due to load balancing of keys across buckets.

Figure 9:
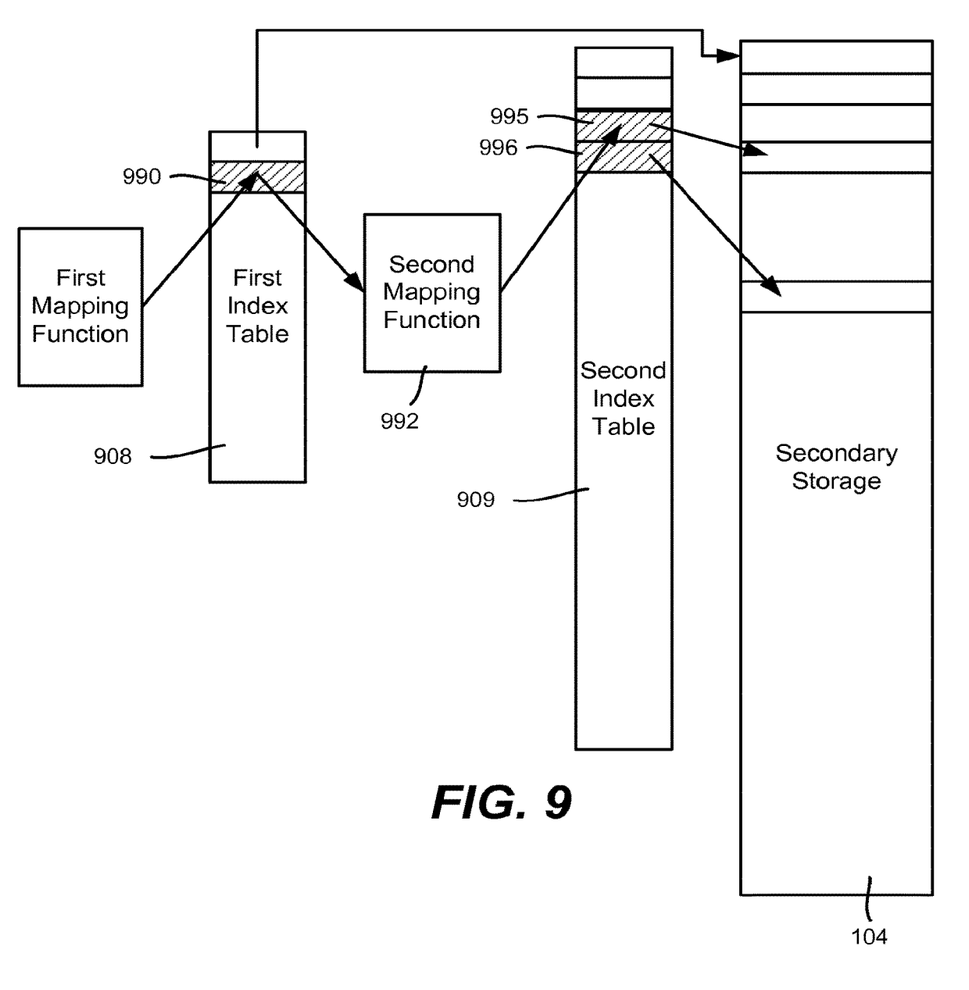
FIG. 9 is a block diagram representing an example architecture and data structures illustrating splitting of an index slot in a first index table into a plurality of slots in a second index table.

Turning to another alternative, FIG. 9 shows an implementation in which a slot 990 in a first index table 908 corresponding to a bucket in secondary storage is mapped by a second mapping function 992 to a sub-slot in a second index table 909 corresponding to a sub-bucket. In general, this splitting via secondary mapping may be used when a bucket becomes too large with respect to the number of records therein.

By way of example, consider that the first mapping function is a range mapping function that maps keys to a slot based on their range, e.g., using simple numbers, keys having values between one and ten go to slot one, keys between eleven and twenty go to slot two, and so on. If the counter associated with a given slot exceeds some splitting value, then that slot/bucket is split by a second mapping function, e.g., keys between eleven and fifteen go to sub-slot 995 while keys between sixteen and twenty go to sub-slot 996. The pointer (or another indicator) in the first index table may be used to tell whether for a given key the pointer points directly to the secondary storage bucket or indicates the need to use the second mapping function to find a sub-bucket pointer in a sub-slot.

Note that while the simplified example above used a basic dividing of a range into two halves, a more complex function may be used. For example, a dynamic B+ treeload balancing function or the like may be used to split a bucket more evenly such that the sub-slot/sub-bucket counts determine how to divide the keys, e.g., keys eleven to thirteen may be in one sub-bucket, and keys fourteen to twenty another; this may readjust as needed. Moreover, more than two sub-slots/sub-buckets per primary slot also may be used.

Note that the above splitting operation involves changing pointers, which can be relatively complex. However, the above-described compaction process inherently adjusts pointers, and thus compacting the records in each sub-bucket (e.g., sub-range) may be performed to automatically adjust the pointers.

One benefit of range mapping is locality. For example, the key-value pairs coming from the same website or other source may have keys that are numerically close to one another. Lookups may occur on such keys around the same time. By range mapping and compacting, flash reads may be reduced, because numerically close keys, often looked up around the same time, will be on the same compacted page in many instances.

Exemplary Operating Environment

Figure 10:
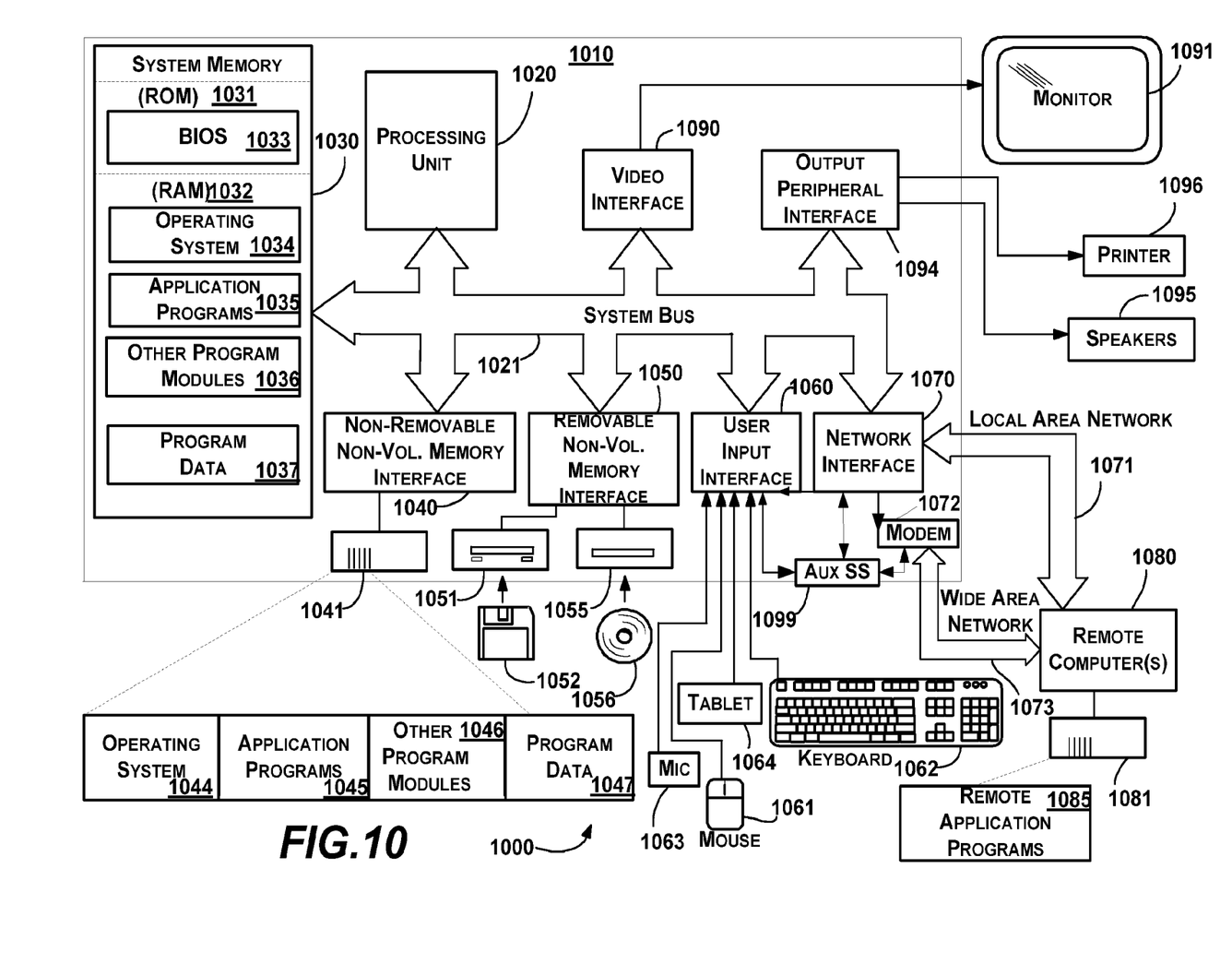
FIG. 10 shows an illustrative example of a computing environment into which various aspects of the present invention may be incorporated.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computing device, comprising:
at least one memory, and at least one processor, wherein the at least one memory and the at least one processor are respectively configured to store and execute instructions for causing the computing device to perform operations, the operations comprising:
maintaining, in a primary storage, an index that correlates data in a persistent memory within a secondary storage; and
mapping a particular key of a plurality of possible keys to a particular slot of the index, wherein the index has a defined quantity of slots, wherein a quantity of possible keys in the plurality of possible keys is greater than the defined quantity of slots of the index, wherein the particular key corresponds to a particular record, wherein the particular slot is configured to maintain a pointer to a last written record in a corresponding bucket of one or more records arranged non-contiguously in the secondary storage, and wherein each record in the corresponding bucket corresponds to a pointer to a previous record in the secondary storage, if the previous record exists, and to a key that maps to the particular slot.

2. The computing device of claim 1, wherein the secondary storage comprises a flash device arranged in pages.

3. The computing device of claim 1, wherein the operations further comprise:
finding a record in the secondary storage based upon an input key, including:
determining another slot that is mapped to the input key;
accessing the secondary storage based on the pointer maintained with the other slot;
finding another bucket that corresponds to the other slot; and
searching the other bucket for the record that corresponds to a key that matches the input key.

4. The computing device of claim 3, wherein the other bucket comprises a plurality of records linked together, wherein a pointer in the other slot points to the last record written to the other bucket, wherein each record in the other bucket maintains a pointer to an earlier record written to the other bucket, and wherein the operations further comprise:
searching the other bucket by following a link from one record to another record until a record that corresponds to the key that matches the input key is found, or until a record that does not have a link to another record is found.

5. The computing device of claim 1, wherein the operations further comprise:
inserting an input record into the secondary storage, including:
determining another slot that is mapped to another key that corresponds to the input record, wherein the input record is associated with a previous pointer maintained in the other slot; and
changing the previous pointer to a new pointer that points to a location in the secondary storage where the input record is written.

6. The computing device of claim 1, wherein the operations further comprise at least one of a hash function, or a range mapping function.

7. The computing device of claim 1, wherein the operations further comprise:
writing a plurality of records of another bucket to the secondary storage.

8. The computing device of claim 1, wherein the operations further comprise:
removing at least one of an invalid record or an orphaned record from the secondary storage.

9. The computing device of claim 8, wherein the operations further comprise:
adding a new record to the secondary storage in a circular-log-structured manner with a head of a log and a tail of the log, wherein adding the new record includes:
appending the new record to an end of the log; and
copying valid records that are not invalid and not orphaned from the head of the log to the tail of the log.

10. A computing device, comprising:
at least one memory, and at least one processor, wherein the at least one memory and the at least one processor are respectively configured to store and execute instructions for causing the computing device to perform operations, the operations comprising:
maintaining an index in a primary storage that indexes data in a secondary storage;
mapping a record's key to one slot of the index, wherein there are more possible keys than slots of the index, wherein each slot of the index is configured to maintain a pointer to a corresponding bucket of one or more non-contiguous records in a secondary storage, and wherein each record in that slot's corresponding bucket has a key and at least one mapping function that maps to that slot; and indicating a probability as to whether a key of a record is in the bucket that corresponds to that slot.

11. The computing device of claim 10, wherein the operations further comprise balancing chain sizes in the buckets.

12. The computing device of claim 10, wherein the mapping comprises a plurality of hash functions that map keys to candidate slots, and a selection of a slot from among the candidate slots based at least in part upon the chain size in the buckets corresponding to the candidate slots.

13. The computing device of claim 10, wherein the operations further comprise indicating a size of a chain of records in the bucket that corresponds to that slot.

14. The computing device of claim 10, wherein the corresponding bucket comprises a plurality of records linked together, wherein the pointer in the slot points to the last record written to the bucket, wherein each record in the bucket maintains a pointer to an earlier record written to the corresponding bucket.

15. A method, comprising:

maintaining, in a random access memory (RAM), an index having pointers to buckets in a secondary storage, wherein the secondary storage is maintained in a log-structured manner with new data appended to an end of a log, and wherein each bucket comprises a linked list of non-contiguous records;

inserting an input record into the secondary storage including mapping a key of the input record to one of the buckets, associating a previous pointer maintained in the index for that bucket with the input record so as to link the input record to a previous record, and changing the previous pointer to a new pointer that points to a location in the secondary storage where the input record is written; and compacting a bucket, including writing data from records of the bucket into a compaction buffer, and writing the compaction buffer into contiguous memory locations in the secondary storage.

16. The method of claim 15, further comprising storing a plurality of input records in a write buffer of the RAM;

looking up a record by accessing the write buffer and searching the plurality of input records for the record having a matching key; and inserting the plurality of input records into a full page of flash memory in the secondary storage.

17. The method of claim 16, wherein a counter is associated with a slot of a plurality of slots, wherein the counter indicates a size of a chain of records in a particular bucket that corresponds to the slot.

18. The method of claim 16, further comprising:

searching a first page for the record having the key that matches the key of the input record, and if the record is not located and a last searched record of the first page has a pointer to another page, repeating the searching for the other page.

19. The method of claim 15, wherein mapping the key to the one of the buckets comprises:

mapping the key to a slot that contains a pointer that indicates whether the pointer points to a record or to an index component.

20. The method of claim 19, wherein if the pointer points to a record, multiple records mapped to the slot form a chain on the secondary storage, and if the pointer points to the index component, applying a second mapping mechanism to map the key to a second slot in the index component, wherein multiple records that map to the slot in the index component form a chain on the secondary storage.

* * * * *